March 17, 1970 P. J. KLEMKOWSKI 3,500,575
BILLFISH ADAPTER
Filed April 30, 1968
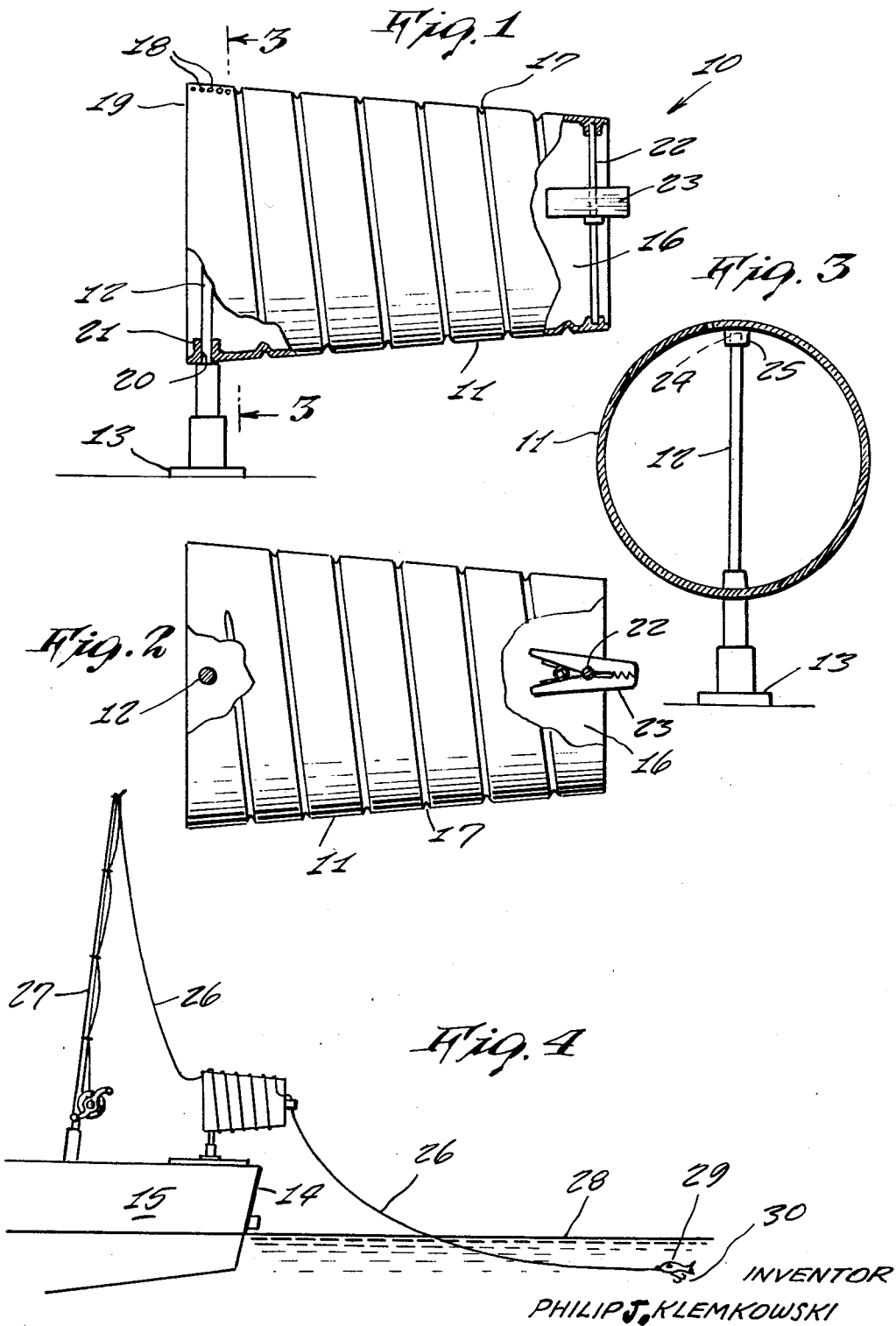
INVENTOR
PHILIP J. KLEMKOWSKI

3,500,575
BILLFISH ADAPTER
Philip J. Klemkowski, 1146 Hull St.,
Baltimore, Md. 21230
Filed Apr. 30, 1968, Ser. No. 725,301
Int. Cl. A01k 91/00
U.S. Cl. 43—43.11           2 Claims

ABSTRACT OF THE DISCLOSURE

A device for transforming a fishing rod placed at the stern of a deep sea fishing boat into a big game fishing apparatus includes a conical drum having a spiral groove around the outer side for receiving a fishing line, the fishing line passing through a small opening at the large end of the drum and being connected to a fishing rod, the opposite end of the fishing line extending from the spiral groove through a clamp and into the water where it is connected to a baited hook.

---

This invention relates generally to fishing devices. More specifically it relates to a billfish adapter.

It is generally well known to those skilled in the fishing art that during the course of a day's fishing, there are any number of fish that are attracted to baits in the wake of the boat stern. If it happens that at the time, no fisherman is near the rod so to effect the necessary paying out of fishing line needed to set the hook, the billfish usually escapes. Accordingly there is a need for improving this situation.

Accordingly it is a principal object of the present invention to provide a billfish adapter wherein fishing line would be automatically released, thus insuring the necessary line pay out.

Another object of the present invention is to provide a billfish adapter which insures that no line anywhere at the stern of the vessel is left unattended.

Yet a further object of the present invention is to provide a billfish adapter which will readily transform fishing lines placed at the stern of a deep sea fishing yacht into a big game fishing device.

Yet a further object is to provide a billfish adapter which would aid in successfully hooking and landing possibly twice the amount of fish that is presently raised to baits.

The billfish family comprises that group of fish that have a bone structure protruding from their upper mouth that is used to strike prey and enemies. The billfish are distinguished by the feature that with their bill they stalk their prey, strike it and then if it is to be successfully hooked and landed, the prey must appear dead in the water for the hook to be set. Accordingly it is a further object of the present invention to provide a billfish adapter which assures that the bait stops moving so to encourage the fish further on to take the fisherman's hook.

At present, outrigger poles of approximately twenty feet or more in length are used and dead-fall line is hung off the side so to effect the dead bait appearance when knocked loose by a raised billfish. However they are in effect poles which allow their use to limited places at the sides of a vessel. Accordingly it is yet a further object of the present invention to provide a billfish adapter which may be used over a stern of a vessel.

Other objects of the present invention are to provide a billfish adapter which is simple in design, inexpensive to manufacture, rugged in construction, easy to use and efficient in operation.

These and other objects will be readily evident upon a study of the following specification and the accompanying drawing wherein:

FIG. 1 is a side elevation view of the present invention shown partly in cross section;

FIG. 2 is a top plan view thereof shown partly in cross-section;

FIG. 3 is a cross sectional view taken on the lines 3—3 of FIG. 1; and

FIG. 4 is a side elevation view of the present invention shown in operative use.

Referring now to the drawing in detail, the reference numeral 10 represents a billfish adapter according to the present invention wherein there is a conically configurated drum 11 supported with its axis upon a horizontal plane, the drum being mounted upon a post or pole 12 that is supported upon a bracket 13 fastened near the stern 14 of a boat 15.

The drum 11 is approximately 18 inches in length and having a 15 inch diameter at its wide end while it has a 12 inch diameter at its narrow end. The drum comprises a hollow member having a central opening 16 extending therethrough, the drum accordingly comprising a conically configurated side wall having a spiral groove 17 upon its outer side.

A plurality of small openings 18 are located upon the upper side between the final turn of the spiral 17 and the edge 19. The openings 18 are of different sizes and are designed to accommodate the popular size fishing lines therethrough. Such sizes may range between $11/64$ to $7/64$ of an inch in diameter.

The post 12 extends through an opening 20 formed in an embossment 21 near the wide end of the drum, the drum accordingly being pivotable about the post.

At the opposite end of the drum, there is a rod 22 secured across the drum opening, the rod 22 supporting a clothes pin type clamp 23.

As shown in FIG. 3 of the drawing, the upper end of the post 12 is fitted within an opening 24 within an embossment 25 on drum 11 diametrically opposite the embossment 21.

In operative use, as shown in FIG. 4 of the drawing, a fishing line 26 extends from a fishing rod 27, the line being threaded through one of the openings 18 selectively, the line then being wound within the groove 17 and then being fitted within the clamp 23 after which the remainder of the line is dropped to the water 28 and is provided with an appropriate bait 29 at its terminal end adjacent the hook 30. In use, the line is released to at least 20 feet beyond the point at which the bait is to be eventually trolled. It is to be noted that the fishing line may be fitted into the spiral groove six times during the wrapping operation upon the drum. The adapter will release approximately 20 feet of slack line wrapped around the drum at any time to the rod with which it is connected.

While various changes may be made in the detailed construction, it is understood that such changes will be within the spirit and scope of the present invention.

I claim:

1. In a billfish adapter, the combination of a drum, a pole and a bracket, said drum being supported upon said pole that is mounted at its lower end upon said bracket fastened near the stern of a boat, means for receiving a fishing line wrapped around said drum, said fishing line wrapped around said drum comprising a portion of said fishing line between a fishing rod and a terminal end of said fishing line having a baited hook, said drum comprises a conical, hollow member having a spiral groove upon an outer side constituting said means for receiving said fishing line, said drum having a central axis which is maintained in a horizontal plane by means of said drum being mounted with said pole extending vertically relative thereto and received within bearing openings near a large diameter end of said drum, and said drum being pivotable about said pole, a plurality of small openings are provided upon the upper side of said drum, all of said openings being located between the last turn of said spiral groove and an edge of said drum defining said wide end, each of said openings being of relatively different size from each other so as to selectively accommodate any size of popular fishing lines.

2. The combination as set forth in claim 1 wherein the opposite end of said drum defining said narrow end includes a rod mounted diametrically thereacross, said rod supporting a clamp thereupon, said clamp being of clothesline type comprised of a pair of pivotable jaws normally urged into a closed position by means of a spring.

References Cited

UNITED STATES PATENTS

| | | | |
|---|---|---|---|
| 704,646 | 7/1902 | Jury | 124—12 X |
| 2,170,594 | 8/1939 | Nicholson | 43—43.12 X |
| 3,012,353 | 12/1961 | Leech | 43—43.12 X |
| 3,136,086 | 6/1964 | Morrison | 43—43.11 X |

WARNER H. CAMP, Primary Examiner

U.S. Cl. X.R.

43—43.12